United States Patent [19]
Berry et al.

[11] Patent Number: 5,964,846
[45] Date of Patent: Oct. 12, 1999

[54] SYSTEM AND METHOD FOR MAPPING PROCESSOR CLOCK VALUES IN A MULTIPROCESSOR SYSTEM

[75] Inventors: Robert F. Berry; Weiming Gu, both of Austin, Tex.

[73] Assignee: International Business Machines Corporation, Armonk, N.Y.

[21] Appl. No.: 08/888,551

[22] Filed: Jul. 7, 1997

[51] Int. Cl.[6] ......................................................... G06F 1/12
[52] U.S. Cl. .............................................................. 709/400
[58] Field of Search .............................. 395/553, 200.78; 709/400, 248

[56] References Cited

U.S. PATENT DOCUMENTS

| | | | |
|---|---|---|---|
| 3,810,119 | 5/1974 | Zieve et al. | 340/172.5 |
| 4,097,860 | 6/1978 | Araseki et al. | 340/347 |
| 4,531,185 | 7/1985 | Halpern et al. | 364/200 |
| 4,584,643 | 4/1986 | Halpern et al. | 364/200 |
| 4,868,514 | 9/1989 | Azevedo et al. | 328/155 |
| 4,899,366 | 2/1990 | Davis et al. | 375/14 |
| 4,906,944 | 3/1990 | Frerking | 331/1 A |
| 4,959,846 | 9/1990 | Apple et al. | 375/118 |
| 5,504,878 | 4/1996 | Coscarella et al. | 395/550 |
| 5,613,127 | 3/1997 | Schultz | 395/557 |

OTHER PUBLICATIONS

IEEE, "A Distributed Real–Time Language and Its Operational Semantics," Proceedings of the Real Time Systems Symposium, Santa Monica, Dec. 5–7, 1989, No. Symp. 10, 5, Dec. 1989, pp. 41–50.

"Trace Synchronization in a Multiprocessor Environments," IBM Technical Disclosure Bulletin, vol. 35, No. 1B, Jun. 1992, pp. 161–162.

"Time–Stamp Synchronization for Parallel Trace Services," IBM Technical Disclosure Bulletin, vol. 36, No. 06B, Jun. 1993, pp. 283–284.

Primary Examiner—Thomas M. Heckler
Attorney, Agent, or Firm—Leslie A. Van Leevwen; Jeffrey S. LaBaw

[57] ABSTRACT

The present invention is directed to a system and method for accurately and efficiently synchronizing and then mapping, or normalizing, processor clocks in a multiprocessor information handling system. The system and method of the present invention provide sufficient granularity for subcycle variations between processors, while taking into account the problem of clock drifts. A plurality of processors are selected for the purpose of synchronization. The clocks located on the processors are synchronized, and then time values between synchronization points are mapped from each secondary processor to an equivalent, or normalized, time value in a primary processor. To accomplish this mapping, three clock differences are calculated. The first clock difference is the time between the first and second synchronization points for the primary processor, and the second clock difference is the time between the first and second synchronization points for the secondary processor. The third clock difference is the time difference between the time value to be mapped in the secondary processor and the first synchronization point in the secondary processor. The third time difference is multiplied by the ratio of the first time difference to the second time difference, and then the result is added to the time value of the primary clock at the first synchronization point. The final result is the mapped, or normalized, time value.

6 Claims, 4 Drawing Sheets

SYSTEM AND METHOD FOR MAPPING PROCESSOR CLOCK VALUES IN A MULTIPROCESSOR SYSTEM

CROSS-REFERENCE TO RELATED APPLICATIONS

The subject matter of this application is related to application Ser. No. 08/822,022 for "System and Method For Synchronizing Plural Processor Clocks In A Multiprocessor System," filed on Mar. 20, 1997, which is assigned to a common assignee with this application, and is incorporated herein by reference.

FIELD OF THE INVENTION

The present invention relates to information handling systems and, more particularly, to a system and method for mapping, or normalizing, synchronized processor clocks in a multiprocessor information handling system.

BACKGROUND OF THE INVENTION

In a multiprocessor information handling system, each processor may have its own independent clock, where each clock is driven by a different oscillator. Although the clocks are designed to run at a specific rate, each may run at a slightly different speed. In addition, external factors, such as room temperature, may affect the accuracy of the oscillators. Therefore, the clocks tend to "drift." In other words, the clocks are running at different and uneven speeds. Over a period of time, such drifts can become large enough to cause problems for applications that depend on consistent clock readings for all processors in the system.

There are many circumstances where processor clocks must be synchronized to perform certain system functions. One example is the sharing of performance information among the multiple processors in the information handling system.

Typically, there is no means provided at the hardware level of an information handling system to provide for clock synchronization. Therefore, the operating system must provide for synchronization for its own processes. In addition to synchronizing the various processor clocks in the system, any clock readings taken must be "normalized," or adjusted, to account for the clock drift problem discussed above.

One prior art synchronization method involves the generation of a general system clock. Although a general system clock may be adequate for limited applications in the information handling system, it is not adequate for performance measurement purposes. For example, the system clock does not provide sufficient granularity for small (subcycle) variations between processors in the system. Further, the system clock requires a considerable amount of system resources which would adversely affect performance of the system if the system clock were continually referred to during performance measurement. This would further skew the performance results.

Some prior art approaches have attempted to solve the clock drift problem at the hardware level. For example, temperature data may be fed back to an oscillator, so that the oscillator can adjust its frequency to reduce or remove variations due to temperature.

Other prior art approaches have focused on clock synchronization in distributed systems, such as networks. Communications among computers connected by networks typically takes much longer than communications among tightly coupled processors in a multiprocessor system. Therefore, the accuracy requirement for clock synchronization in a distributed system is significantly less than the accuracy requirement for a multiprocessor system. The prior art synchronization methods used in distributed systems would not work with the required degree of accuracy for a multiprocessor system, especially if the multiprocessor system is a tightly couple, symmetrical, shared-memory multiprocessor system.

Consequently, it would be desirable to have a system and method of accurately and efficiently synchronizing and then mapping, or normalizing, processor clocks in a multiprocessor information handling system. It would be desirable to have a system and method which provide sufficient granularity for subcycle variations between processors, while taking into account the problem of clock drifts.

SUMMARY OF THE INVENTION

Accordingly, the present invention is directed to a system and method for accurately and efficiently synchronizing and then mapping, or normalizing, processor clocks in a multiprocessor information handling system. The system and method of the present invention provide sufficient granularity for subcycle variations between processors, while taking into account the problem of clock drifts.

The present invention selects a plurality of processors in an information handling system for the purpose of synchronization. The clocks located on the processors are synchronized, and then time values between synchronization points are mapped from each secondary processor to an equivalent, or normalized, time value in a primary processor. To accomplish this mapping, three clock differences are calculated. The first clock difference is the time between the first and second synchronization points for the primary processor, and the second clock difference is the time between the first and second synchronization points for the secondary processor. The third clock difference is the time difference between the time value to be mapped in the secondary processor and the first synchronization point in the secondary processor. The third time difference is multiplied by the ratio of the first time difference to the second time difference, and then the result is added to the time value of the primary clock at the first synchronization point. The final result is the mapped, or normalized, time value.

The present invention is also directed to an information handling system capable of executing the above method, and to a computer readable medium for implementing the above described method.

An advantage of the present invention is that any time value in any secondary processor may be mapped to an equivalent value in the primary processor. Another advantage of the present invention is that it substantially eliminates the problem of clock drifts in a multiprocessor information handling system. A further advantage of the present invention is that it provides the required degree of accuracy for use in a tightly coupled, symmetrical, shared-memory multiprocessor system.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
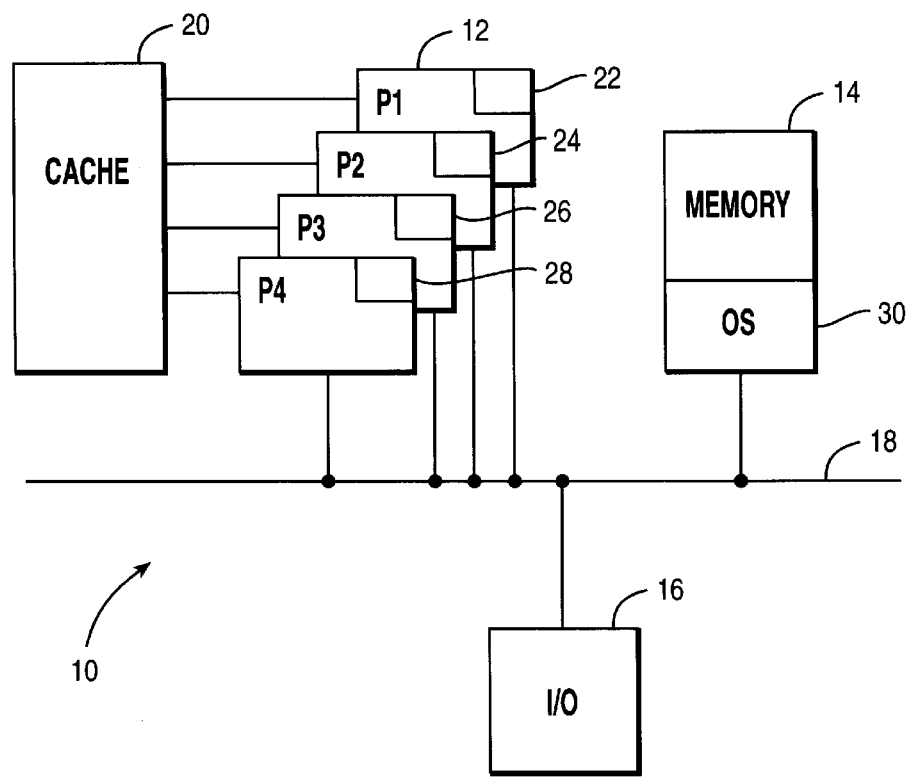
FIG. 1 is a block diagram of an information handling system implementing the present invention.

Referring now to FIG. 1, a multiprocessor information handling system in accordance with the present invention will be described. Information handling system 10 includes a plurality of processors 12. In the described embodiment, four processors 12 labeled P1, P2, P3, and P4 are included. Each of processors 12 is connected to memory 14 and I/O system 16 by system bus 18. Each of processors 12 may also be connected to cache 20, which may be either dedicated cache or shared cache, depending upon system requirements. The arrangement of memory system 14, I/O system 16, and cache 20 is not critical to the present invention and may be implemented in any number of well-known designs.

Each processor 12 includes an internal clock, represented as clock 22 in P1, clock 24 in P2, clock 26 in P3, and clock 28 in P4. Memory system 14 also includes one or more images of operating system 30 which controls the operation of information handling system 10. Operating system 30 may be any one of a number of well-known operating systems, such as the IBM OS/2 operating system.

Note that a multiprocessor information handling system with n processors, where n is the number of processors, is also referred to as an n-way multiprocessor system. Almost all of today's multiprocessor systems support "atomic" memory access operations. A memory operation is said to be "atomic" if the result of the operation is seen as a whole by any processor in the information handling system. As an example, if a shared memory variable, with an initial value of 100, is incremented by 10, the value of the shared variable is seen by any processor in the system as either 100 or 110, rather than as any other number. The present invention is preferably implemented on a system that supports atomic memory access operations, and in the following description, it is assumed that the system supports atomic memory access operations.

Note that processor clocks 22, 24, 26 and 28 may operate at slightly different and uneven speeds due to external factors, such as room temperatures. For example, suppose that the maximum clock speed variation of each processor is 0.5 ticks per million. On a multiprocessor system with processor clocks running at 100 MHz, during any one second period of time, any processor clock may be 50 ticks faster or slower than 100 MHz. In other words, if all processors start at the same clock value, during a one second period of time any two processors in the multiprocessor system might be 100 ticks apart at most.

A system and method for synchronizing plural processor clocks in a multiprocessor system is described in application Ser. No. 08/822,022. The referenced application describes a method of reading processor clocks simultaneously in a multiprocessor information handling system. The basic synchronization method for synchronizing two processors requires that a shared variable, sync_flag_1, be set to zero before the process begins. After the shared variable sync_flag_1 is set to zero, an iteration counter is set to a high number, such as 128 or 256. Next, another shared variable, sync_flag_2, is set to zero. Sync_flag_1 is incremented by one, and sync_flag_1 is tested to determine if the value of sync_flag_1 is equal to the number of processors being synchronized. If not, the process loops until sync_flag_1 is equal to the number of processors being synchronized, and then the processor clock is read.

In this case, neither processor will proceed until both processors have incremented sync_flag_1. In other words, each processor increments sync_flag_1 and then waits. Once each processor has incremented sync_flag_, sync_flag_1 will be equal to the number of processors being synchronized, i.e. in this example, sync_flag_1 will be equal to two. This will cause both processors to read their respective internal clocks simultaneously, or nearly simultaneously. Note that the on-chip clock on each processor is also referred to as a cycle counter. The cycle counter typically runs at the speed of the processor. For example, in a 100 MHZ processor, the cycle counter counts 100 million cycles, also referred to as ticks, per second. The number read from the internal clock is referred to as a cycle count, or as a number of ticks. After reading the processor clock, each processor stores the value read.

To increase the accuracy of the process, three separate sync flags are used, and the process is invoked three times. After the process is invoked three times, the iteration counter is decremented by one. A test is made to determine if the iteration count is zero. If the iteration count is zero, the average processor clock value is calculated, and synchronization of the two processor clocks is complete. If the iteration count is not equal to zero, the process continues until the iteration count reaches zero. The total number of times each processor reads its clock is the number of iterations multiplied by three (clocks are read three times per iteration). The resulting synchronized clock values are calculated by averaging the clock readings from multiple invocations of the clock synchronization process on each processor.

While the basic synchronization method may be used for synchronizing any number of processor clocks, the results become less accurate as more processor clocks are synchronized. To increase accuracy on systems with more than two processors, a more sophisticated method may be used as described below.

In those multiprocessor system where there are more than two processors, one processor is designated as the primary processor and the rest are secondary processors. Note that any one of the processors may be chosen as the primary processor. Each secondary processor synchronizes with the primary processor by invoking the basic synchronization method as described above. Because the secondary processors synchronize with the primary processor at different times (i.e. one secondary processor at a time synchronizes with the primary processor), the results must next be adjusted. The purpose of the clock adjustment process is to relate all average processor clock values to a base average processor clock value, i.e. the average processor clock value of the primary processor.

The clock adjustment process for the primary processor first tests to determine whether the primary processor is to be synchronized with the first secondary processor. If yes, the process immediately exits because the primary processor and the first secondary processor have been previously synchronized. If the primary processor is to be synchronized with any secondary processor other than the first secondary processor, a clock adjustment is calculated. The clock adjustment is the difference between the average processor clock value of the primary processor when it is synchronized with the first secondary processor and the average processor clock value of the primary processor when it is synchronized with the current processor. The clock adjustment value is then written to a register for storing the clock adjustment value.

The clock adjustment process in each secondary processor first tests to determine if the selected secondary processor is the first secondary processor. If true, the clock adjustment process is exited for the reason stated above. If false, a test is made to determine if a clock adjustment value is ready. If not, the process loops until the clock adjustment value is ready. The clock adjustment value is ready when the primary processor has finished calculating it and has stored it in a known shared memory location, where it can then be read by the secondary processor. When the clock adjustment value is ready, the clock adjustment value is read, and the synchronized clock value of the selected secondary processor is adjusted.

As an example of applying the clock synchronization method described above, assume that clock readings of 600, 1200, 2000, and 1600 are returned for processors P1, P2, P3, and P4, respectively. This means that at some point in time, when the clock reading of processor P1 is 600, at exactly the same time the clock readings of processors P2, P3, and P4 are 1200, 2000, and 1600, respectively.

Figure 2A:
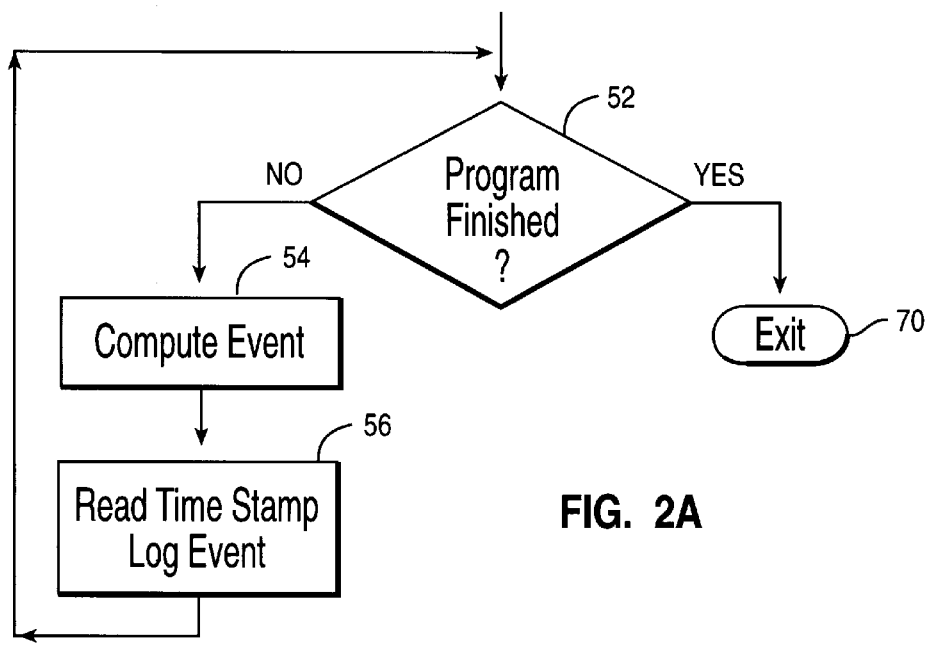
FIGS. 2A and 2B are flow charts depicting a program executing on the system of FIG. 1, and using the method of the present invention.

Referring now to FIG. 2A, a program running in a multiprocessor information handling system that uses the present invention is described. The present invention is often used for tracing program execution in multiprocessor information handling systems. Each processor in the system starts execution at step 52 and exits at step 70. At step 52, a check is made to determine whether the program is finished. If it is, the program exits (step 70) on the particular processor. If the program is not finished, the processor performs some computation on behalf of the program (step 54). An event entry is logged and current time stamp is taken (step 56). The processor then returns to step 52 and the program continues to execute.

Figure 2B:
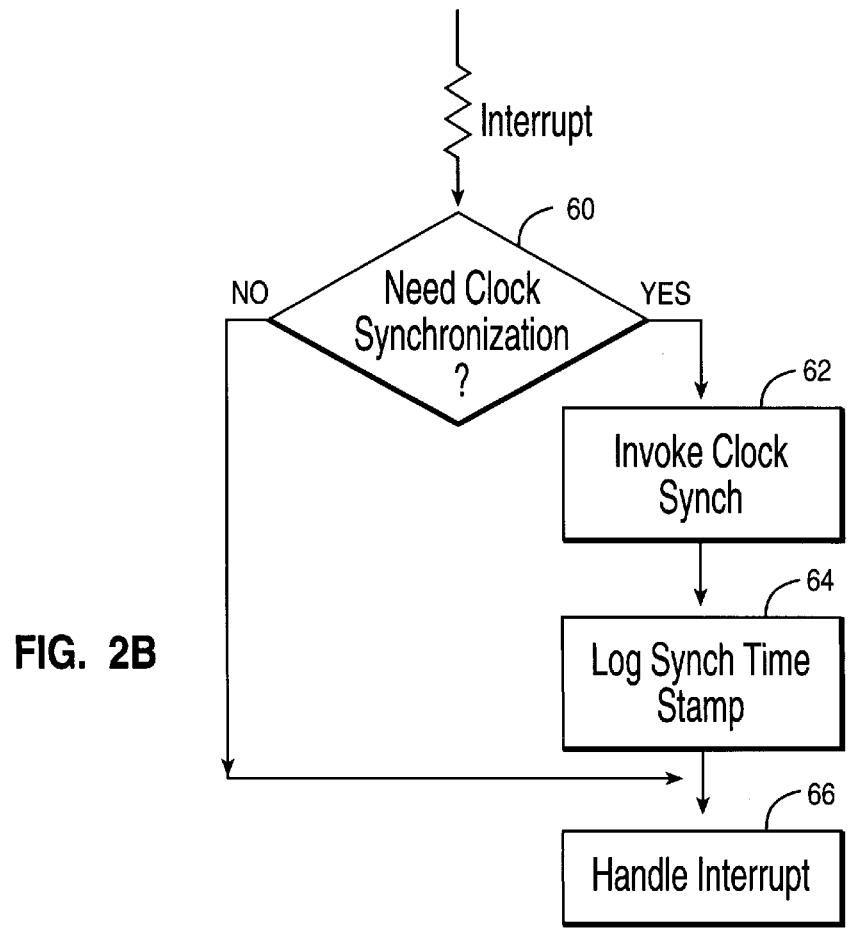

At any step within this execution loop, the processor can be interrupted, as shown in FIG. 2B. For example, a system timer may interrupt each processor in the system at predetermined time intervals. When an interrupt occurs, a check is made (step 60) to determine whether a clock synchronization is needed by calculating the time difference between the current time and the last time clock synchronization was invoked. Typically, this check is performed by a system timer interrupt handler. If the system timer is running at 100 Hz, the system is interrupted by this timer once every 10 milliseconds. If clock synchronization is needed every second, then the clock synchronization should be invoked once every 100 times the system is interrupted by the system timer.

Assume that the maximum variation of clock speeds in a multiprocessor system is Rv ticks per second, and the time duration between two consecutive clock synchronizations is Dt. Thus the maximum clock variation between any two processors in the multiprocessor system during this period of time, represented as Vm, is described by the following equation:

$$Vm = 2*Rv*Dt$$

Note that Rv is typically a constant if external conditions are constant. If Vm, the maximum clock variation to between any two processors, is fixed, then the duration in which a clock synchronization is needed can be calculated by the following equation:

$$Dt = Vm/(2*Rv)$$

There are certain times when Rv can not be assumed to be constant. For example, if a system is booting up from a cold state, then chip temperatures will rise rapidly, and the clock variation is relatively large. For situations where Rv is large, the clock synchronization has to be invoked more frequently, depending on the accuracy requirements of the application.

If Dt, the duration between two consecutive clock synchronization points, is fixed, then the maximum variation between any two processors can be calculated by the following equation:

$$Vm = Dt*2*Rv$$

For example, if clock speed varies by 5 ticks per second, then during a period of time of 10 seconds, the maximum clock difference between any two processor clocks is 100 ticks. On the other hand, if an application can tolerate 100 ticks of inaccuracy for the clocks, then the clock synchronization algorithm must be invoked at least once every 10 seconds.

Note that invocation of the clock synchronization method at interrupt time is one way of implementing the present invention. However, the method of the present invention may be implemented without using interrupts.

Still referring to FIG. 2B, if a clock synchronization is required, the clock synchronization method of the present invention is invoked (step 62). This method is described in detail below, with reference to FIG. 4. The synchronized time stamp is logged (step 64), and then appropriate interrupt handling is completed (step 66).

Figure 3:
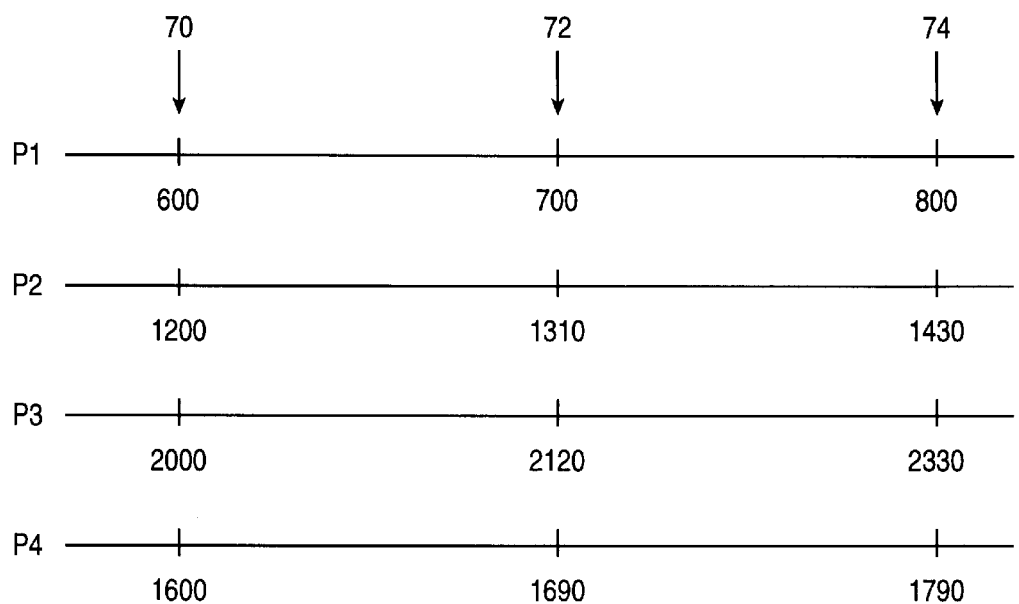
FIG. 3 is a timing chart showing the synchronization of four processor clocks at three different synchronization points.

Referring now to FIG. 3, assume that clocks P1, P2, P3, and P4 are synchronized at three points in time, as discussed above. At the first synchronization point 70, clocks P1, P2, P3, and P4 are synchronized at 600, 1200, 2000, and 1600, respectively. At the second synchronization point 72, they are synchronized at 700, 1310, 2120, and 1690, respectively. At the third synchronization point 74, they are synchronized at 800, 1430, 2330, and 1790, respectively.

Assume that the clock rates are constant between any two synchronization points. Therefore, clocks on processors other than P1 can be adjusted according to the rate on P1. In the example shown in FIG. 3, once the clock readings have been synchronized, it is possible to normalize, or map, all clock readings on clocks P2, P3, and P4 to equivalent clock values on P1. The method for performing this adjustment, or mapping, is described below with reference to FIG. 4.

Assume that a time value for a given processor clock P2 is to be mapped to a primary processor clock P1. Assume further that the time value to be mapped falls between two synchronization points, T0 and T1. The general method for mapping a clock value according to the present invention is as follows:

$$\text{Relative Value} = ((Dt\_1/Dt\_2)*(T - \text{Clock2}\_T0)) + \text{Clock1}\_T0$$

Dt_1 is the time difference between the two synchronization points, T0 and T1, in the primary processor clock (i.e. the processor clock to which the other processor clocks will be mapped). Dt_2 is the time difference between the same two synchronization points, T0 and T1, in the processor clock which is being mapped to the primary processor. T is the time value from P2 which is being mapped. Clock2_T0 is the time value of clock P2 at time T0, and Clock1_T0 is the time value of clock P1 at time T0.

Note that the error margin of the above mapping calculation is bounded by the maximum clock drift on processor P1 (i.e. Rv*Dt_1) between the two synchronization points T0 and T1. The error margin of the mapping calculation is defined as the difference between the mapped clock value on processor P1 and the actual equivalent clock value on P1. In other words, if two events on any two processors occur at two times, at least (2*Rv*Dt_1) ticks apart, then the mapped clock values obtained from the above mapping algorithm will maintain the relative time order in which they occurred.

Figure 4:
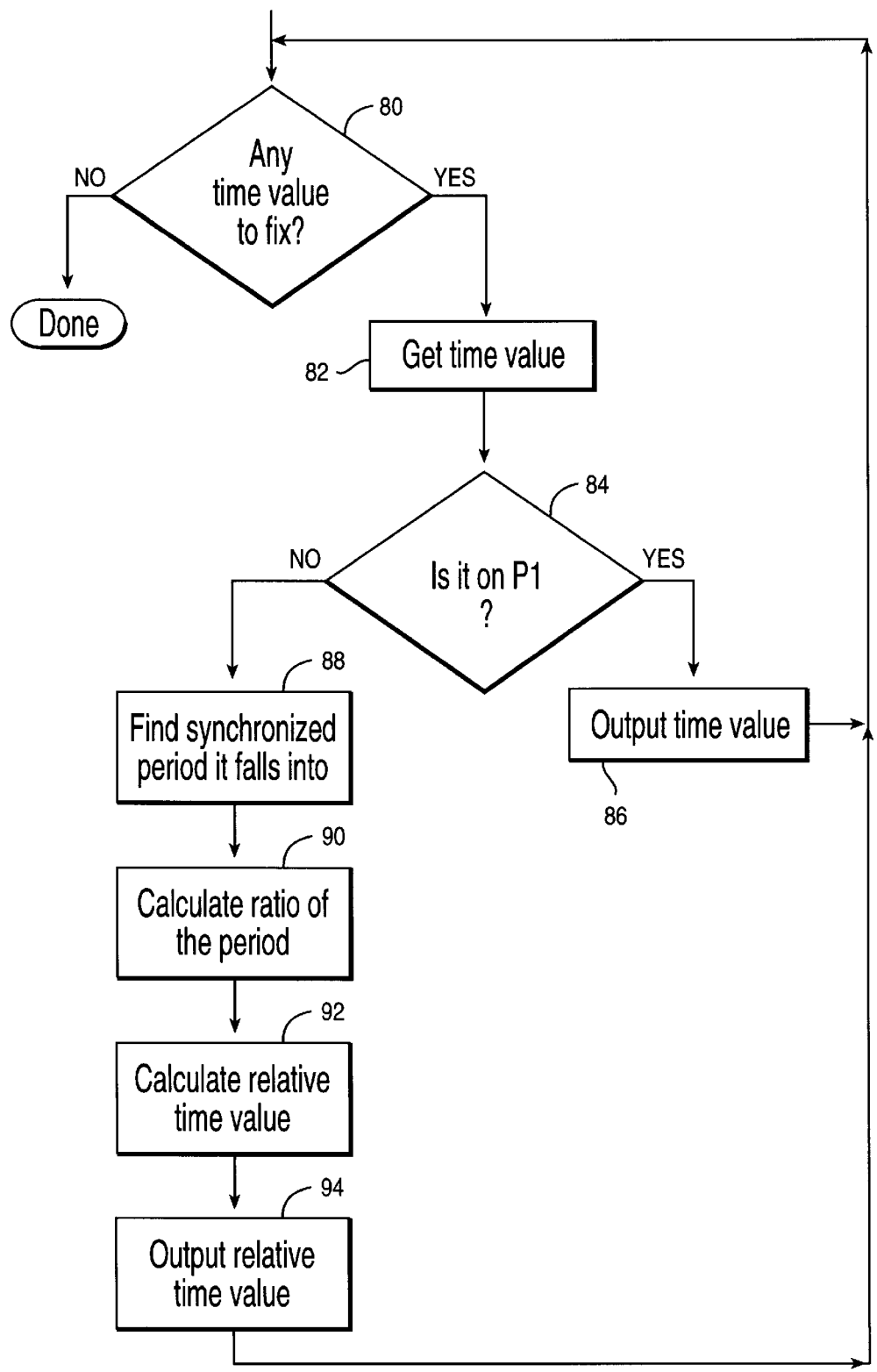
FIG. 4 is a flowchart illustrating a method for mapping, or normalizing, processor clocks according to the present invention.

Referring now to FIG. 4, a method for normalizing, or mapping, a clock reading will now be described. The first step is to determine if there is a clock reading, or time value, to be adjusted (step 80). If so, the time value is obtained (step 82). Next, a test is performed to determine the source of the time value (i.e. is it a clock reading from P1, P2, P3, or P4?) (step 84). If the time value is from clock P1, no adjustment is needed, and the time value is output as is (step 86). If the time value is from a clock other than P1, an adjustment is necessary.

To adjust the time value to an equivalent P1 value first requires finding the synchronized period into which the time value falls (step 88). For example, a time value of 2060 on processor clock P3 falls in between the synchronized values of 2000 and 2120. The next step is to calculate the ratio of P1's difference to P3's difference (i.e. Dt_1/Dt_2 in the equation above) (step 90). In the example given, Dt_1 is equal to 100 (i.e. 700−600), Dt_2 is equal to 120 (i.e. 2120−2000), and the ratio of Dt_1 to Dt_2 is thus 100/120.

Next, the relative time value is calculated (step 92). In this example, T is equal to 2060, Clock1_T0 is equal to 2000, and Clock0_T0 is equal to 600. Thus, the relative time value is equal to ((100/120)*(2060−2000))+600, which is equal to 650. Therefore, the adjusted time value, 650, is output in step 94.

Figure 5:
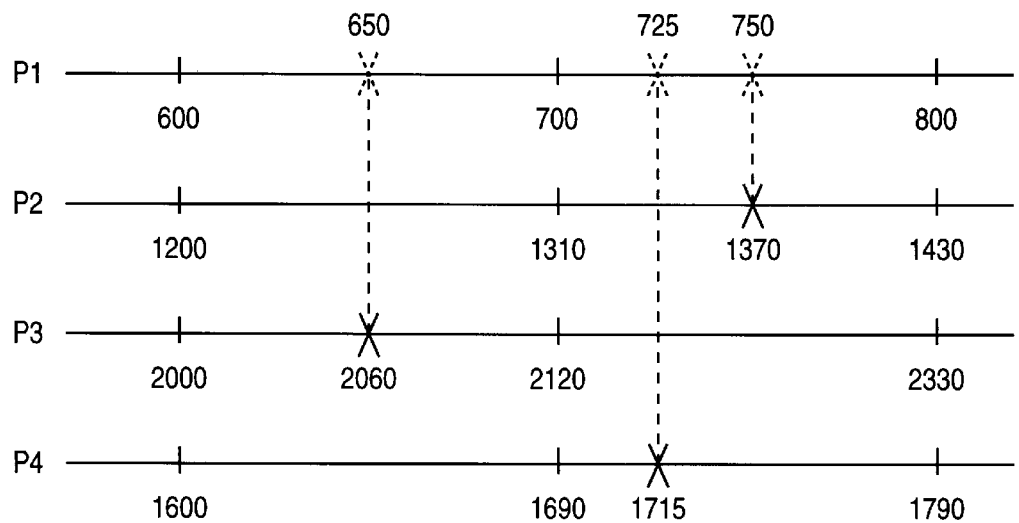
FIG. 5 is a timing chart showing the mapping, or normalization, of the processor clock readings from FIG. 3.

Referring now to FIG. 5, equivalent P1 time values are depicted for a time value of 2060 on processor clock P3, a time value of 1715 on processor clock P4, and a time value of 1370 on processor clock P2. The relative time values for P2 and P4 were obtained using the same method used for obtaining the relative time value for P3 (as described above with reference to FIG. 4).

Once all four processors are synchronized, it is possible to calculate relative time values, which can be used for many purposes, including, but not limited to, performance measurement and analysis. As an example, suppose that a performance tool obtains the following system events regarding locks in the various processors in the information handling system. Locks are used extensively in multiprocessor systems to synchronize accesses to shared resources. Typically, a processor acquires a lock before using a system resource and releases the lock after finishing using it.

| Processor | Time Stamp | Action |
|---|---|---|
| P1 | 785 | Acquire |
| P1 | 790 | Release |
| P2 | 1233 | Acquire |
| P2 | 1255 | Release |
| P2 | 1370 | Acquire |
| P2 | 1394 | Release |
| P3 | 2072 | Acquire |
| P3 | 2096 | Release |
| P4 | 1681 | Acquire |
| P4 | 1701 | Release |

The first step is calculate an equivalent P1 time for each trace event. The equivalent times are calculated using the method described in FIG. 4. In this example, equivalent times are as follows:

| Processor | Time Stamp | Action | Equivalent P1 Time |
|---|---|---|---|
| P1 | 785 | Acquire | 785 |
| P1 | 790 | Release | 790 |
| P2 | 1233 | Acquire | 630 |
| P2 | 1255 | Release | 650 |
| P2 | 1370 | Acquire | 750 |
| P2 | 1394 | Release | 770 |
| P3 | 2072 | Acquire | 660 |
| P3 | 2096 | Release | 680 |
| P4 | 1681 | Acquire | 690 |
| P4 | 1701 | Release | 710 |

Finally, the trace events can be ordered according to their equivalent P1 time, as depicted below. This ordering provides a picture of which events occurred, and in what order they occurred.

| P1 | P2 | P3 | P4 | Equivalent P1 Time |
|---|---|---|---|---|
|  | Acquire |  |  | 630 |
|  | Release |  |  | 650 |
|  |  | Acquire |  | 660 |
|  |  | Release |  | 680 |
|  |  |  | Acquire | 690 |
|  |  |  | Release | 710 |
|  | Acquire |  |  | 750 |
|  | Release |  |  | 770 |
| Acquire |  |  |  | 785 |
| Release |  |  |  | 790 |

Although the present invention has been described with reference to performance tuning, the system and method of the present invention has many other uses. The invention may be used in any application where time stamps are logged and post processed. For example, operating systems may log the time of system events for trouble shooting purposes. Kernel level programs, such as the operating system kernel and device drivers, may use the present invention to assist with debugging time sensitive operations.

The system and method of the present invention is also not limited to mapping time between synchronization points. The invention may also be used to extrapolate out into the future. However, the maximum error margin an application can tolerate will determine how far out into the future the present invention can be used.

Although the invention has been described with a certain degree of particularity, it should be recognized that elements thereof may be altered by persons skilled in the art without departing from the spirit and scope of the invention. One of the preferred implementations of the invention is as sets of instructions resident in the memory 14 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically that the medium carries computer readable information. The invention is limited only by the following claims and their equivalents.

What is claimed is:

1. An information handling system, comprising:

a first processor, including a first processor clock internal to said first processor;

a second processor, including a second processor clock internal to said second processor, wherein a first time value in the first processor clock corresponds to a second time value in the second processor clock, and wherein a third time value in the first processor clock corresponds to a fourth time value in the second processor clock;

means for mapping a selected time value in the second processor clock to an equivalent time value in the first processor clock, wherein said selected time value is between the second time value and the fourth time value, and wherein said means for mapping comprises:

means for determining a ratio of a first time difference to a second time difference, wherein the first time difference is a time between the first time value and the third time value, and the second time difference is a time between the second time value and the fourth time value; and means for using the ratio to calculate the equivalent time value.

2. An information handling system according to claim 1, wherein said means for using the ratio to calculate the equivalent time value comprises:

means for determining a third time difference, wherein the third time difference is a time between the selected time value and the second time value;

means for multiplying the third time difference by the ratio to obtain an intermediate result; and means for adding the intermediate result to the first time value to obtain the equivalent time value.

3. A method for mapping a selected time value in a second processor clock to an equivalent time value in a first processor clock, comprising:

determining a ratio of a first time difference to a second time difference, wherein a first time value in the first processor clock corresponds to a second time value in the second processor clock, and wherein a third time value in the first processor clock corresponds to a fourth time value in the second processor clock, and wherein the first time difference is a time between the first time value and the third time value, and the second time difference is a time between the second time value and the fourth time value; and using the ratio to calculate the equivalent time value.

4. A method according to claim 3, wherein said using the ratio to calculate the equivalent time value comprises:

determining a third time difference, wherein the third time difference is a time between the selected time value and the second time value;

multiplying the third time difference by the ratio to obtain an intermediate result; and adding the intermediate result to the first time value to obtain the equivalent time value.

5. A computer program in a computer usable medium, for use in mapping a selected time value in a second processor clock to an equivalent time value in a first processor clock, comprising:

means for determining a ratio of a first time difference to a second time difference, wherein a first time value in the first processor clock corresponds to a second time value in the second processor clock, and wherein a third time value in the first processor clock corresponds to a fourth time value in the second processor clock, and wherein the first time difference is a time between the first time value and the third time value, and the second time difference is a time between the second time value and the fourth time value; and means for means for using the ratio to calculate the equivalent time value.

6. A method according to claim 5, wherein said means for using the ratio to calculate the equivalent time value comprises:

means for determining a third time difference, wherein the third time difference is a time between the selected time value and the second time value;

means for multiplying the third time difference by the ratio to obtain an intermediate result; and means for adding the intermediate result to the first time value to obtain the equivalent time value.

* * * * *